US011914330B2

(12) United States Patent
Hayashi et al.

(10) Patent No.: US 11,914,330 B2
(45) Date of Patent: Feb. 27, 2024

(54) TIMEPIECE

(71) Applicant: Seiko Epson Corporation, Tokyo (JP)

(72) Inventors: Koki Hayashi, Shiojiri (JP); Kenichiro Matsumoto, Fujimi (JP); Kazunori Hoshino, Matsumoto (JP); Hiroshi Watanabe, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 252 days.

(21) Appl. No.: 17/483,872

(22) Filed: Sep. 24, 2021

(65) Prior Publication Data

US 2022/0100149 A1 Mar. 31, 2022

(30) Foreign Application Priority Data

Sep. 25, 2020 (JP) ................................ 2020-161000

(51) Int. Cl.

*G04B 39/02* (2006.01)
*G04B 39/00* (2006.01)
*G04B 45/00* (2006.01)

(52) U.S. Cl.

CPC .......... *G04B 39/02* (2013.01); *G04B 39/002* (2013.01); *G04B 39/006* (2013.01); *G04B 45/0076* (2013.01)

(58) Field of Classification Search

CPC .... G04B 39/02; G04B 39/002; G04B 39/006; G04B 45/0076

See application file for complete search history.

(56) References Cited

U.S. PATENT DOCUMENTS

| | | | | |
|---|---|---|---|---|
| 3,271,945 A * | 9/1966 | Anderson | G04B 19/223 | 968/168 |
| 5,592,443 A * | 1/1997 | Kasaya | G04B 45/0084 | 368/232 |
| 7,079,453 B2 | 7/2006 | Minami et al. | | |
| 8,596,860 B2 * | 12/2013 | Verdon | G04D 3/065 | 368/296 |
| 10,685,626 B2 | 6/2020 | Kim et al. | | |

FOREIGN PATENT DOCUMENTS

| | | |
|---|---|---|
| JP | H01-078989 U | 5/1989 |
| JP | 2004-333239 A | 11/2004 |
| JP | 2017-194464 A | 10/2017 |

* cited by examiner

*Primary Examiner* — Edwin A. Leon
*Assistant Examiner* — Sean R Brannon
(74) *Attorney, Agent, or Firm* — Harness, Dickey & Pierce, P.L.C.

(57) ABSTRACT

A timepiece including: a dial; a windshield glass having a plurality of curved surfaces that differ from each other in curvature; and a hand disposed between the dial and the windshield glass, wherein the windshield glass includes: a first curved surface having a first curvature and including a center of the windshield glass; a second curved surface disposed adjacent to the first curved surface and having a second curvature larger than the first curvature; and a third curved surface disposed adjacent to the second curved surface and having a third curvature larger than the second curvature, a thickness of the first curved surface and a thickness of the second curved surface are equal, and in plan view, a distal end of the hand is disposed on a center C side of the windshield glass with respect to a boundary between the second curved surface and the third curved surface.

5 Claims, 5 Drawing Sheets

| | FIRST-SURFACE-SIDE CURVED SURFACE | SECOND-SURFACE-SIDE CURVED SURFACE | THIRD-SURFACE-SIDE CURVED SURFACE |
|---|---|---|---|
| CURVATURE RADIUS | FR1 | FR2 ( FR1 > FR2 > FR3 ) | FR3 |
| CURVATURE | FC1 | FC2 ( FC1 < FC2 < FC3 ) | FC3 |
| THICKNESS | FT1 | FT2 ( FT1 = FT2 = FT3 ) | FT3 |

FIG. 4

TIMEPIECE

The present application is based on, and claims priority from JP Application Serial Number 2020-161000, filed Sep. 25, 2020, the disclosure of which is hereby incorporated by reference herein in its entirety.

BACKGROUND

1. Technical Field

The present disclosure relates to a timepiece.

2. Related Art

Conventionally, there has been known a cover glass (windshield glass) for a wristwatch having an end portion thereof formed in a curved shape (curved surface) (for example, JP-A-1-78989). For example, when a windshield glass is constituted of a plurality of straight inclined surfaces and the windshield glass has a ridge line at an intersecting portion of the inclined surfaces, there is a case where a drawback arises that the dial and the hands visually recognized through the windshield glass appear in a divided manner by the ridge line. With respect to the windshield glass described in JP-A1-78989, the end portion of the windshield glass is curved and does not have a ridge line and hence, the drawback that the dial and the hands appear in a divided manner can be eliminated.

However, in the windshield glass described in JP-A-1-78989, there may be a case where the dial and the hands visually recognized through the windshield glass appear in a distorted manner.

SUMMARY

A timepiece according to the present disclosure includes: a dial; a windshield glass configured to protect the dial and having a plurality of curved surfaces that differ from each other in curvature; and a hand that is disposed between the dial and the windshield glass and indicates information other than hours and minutes, wherein the windshield glass includes: a first curved surface having a first curvature and includes the center of the windshield glass; a second curved surface disposed adjacent to the first curved surface and having a second curvature larger than the first curvature; and a third curved surface disposed adjacent to the second curved surface and having a third curvature larger than the second curvature, a thickness of the windshield glass in a direction normal to the first curved surface and a thickness of the windshield glass in a direction normal to the second curved surface are equal, and in plan view as viewed in a first direction directed from the dial toward the windshield glass, a distal end of the hand is disposed on a side of a center of the windshield glass with respect to a boundary between the second curved surface and the third curved surface.

BRIEF DESCRIPTION OF THE DRAWINGS

FIG. 4 is a table showing radii of curvatures, curvatures, and thicknesses of main portions of the windshield glass.

DESCRIPTION OF EXEMPLARY EMBODIMENTS

First Exemplary Embodiment

Figure 1:
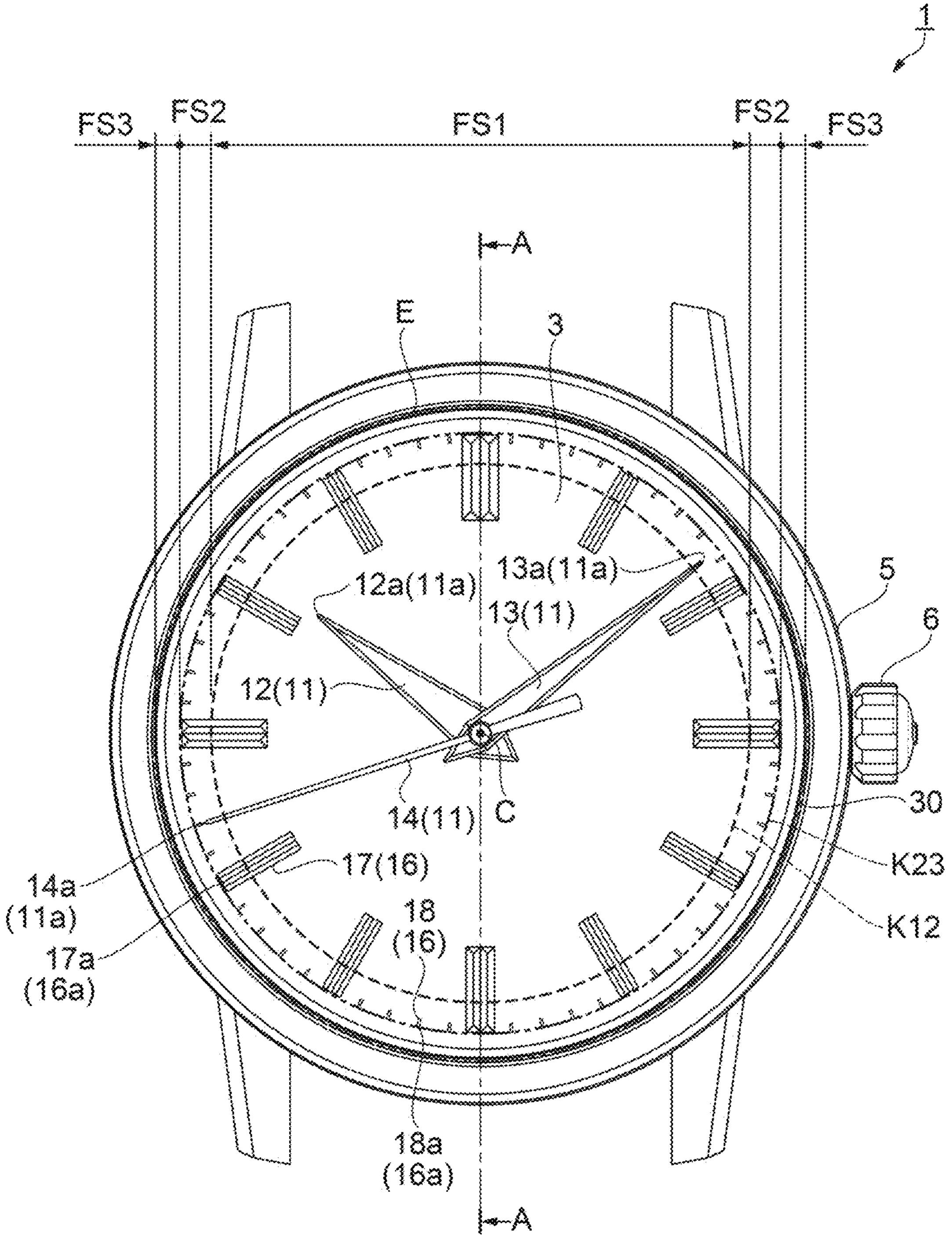
FIG. 1 is a plan view of a timepiece according to an exemplary embodiment.

A timepiece 1 according to the present exemplary embodiment has a movement 2 that is a mechanical body including a drive portion. The movement 2 on which a dial 3 and hands 11 are attached is housed in a case 5 and is protected by a windshield glass 30. Accordingly, in the timepiece 1 according to the present exemplary embodiment, the movement 2, the dial 3, and the windshield glass 30 are sequentially arranged in one direction (see FIG. 2).

In the following description, a direction along which the movement 2, the dial 3, and the windshield glass 30 are arranged in this order is referred to as a +Z direction, and a direction opposite to the +Z direction is referred to as a −Z direction. A direction orthogonal to the +Z direction and directed from the center C of the windshield glass 30 toward an outer edge E of the windshield glass 30 is referred to as an X direction.

The +Z direction is an example of a first direction directed from the dial toward the windshield glass in the present application. Viewing as viewed from a +Z direction side is a plan view as viewed in the first direction directed from the dial toward the windshield glass in the present application, and viewing as viewed from the +Z direction side is hereinafter referred to as a plan view as viewed in the Z direction.

Further, viewing as viewed in the X direction is referred to as viewing in plan view as viewed in the X direction.

1.1 Summary of Timepiece

Figure 2:
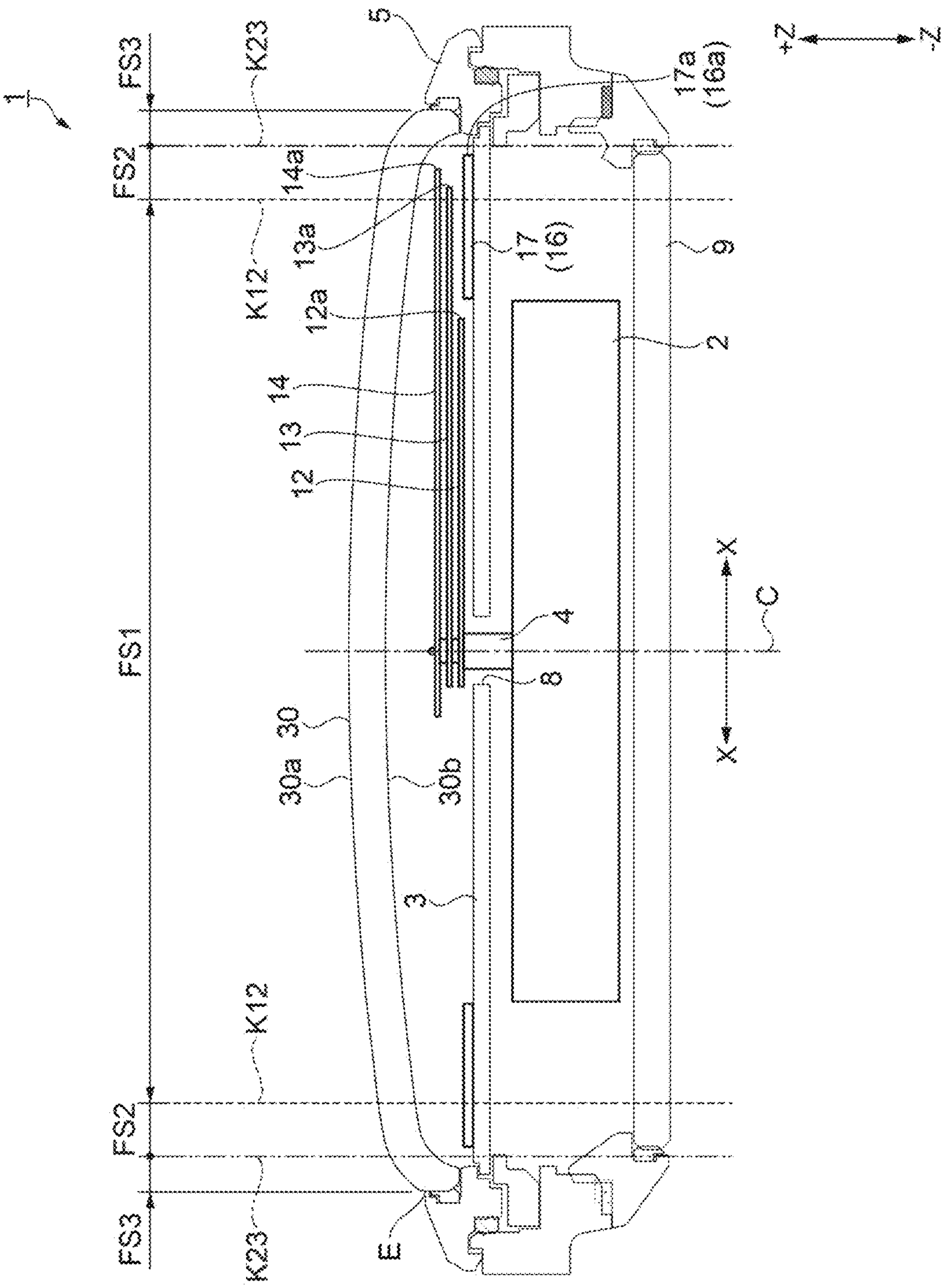
FIG. 2 is a cross-sectional view of the timepiece according to the exemplary embodiment.

FIG. 1 is a plan view of the timepiece 1 according to the present exemplary embodiment, wherein a state of the timepiece 1 as viewed in the Z direction is illustrated. FIG. 2 is a cross-sectional view taken along a line A-A in FIG. 1, and is a cross-sectional view of the timepiece 1 according to the present exemplary embodiment. In FIG. 1, the center C of the windshield glass 30 is indicated by a black dot, and in FIG. 2 and FIG. 3 that is described later, the center of the windshield glass 30 is indicated by a dotted chain line.

Firstly, an overview of the timepiece 1 according to the present exemplary embodiment is described with reference to FIG. 1 and FIG. 2.

As illustrated in FIG. 1, the timepiece 1 according to the present exemplary embodiment is a three-hand analog wristwatch, and includes the case 5, the dial 3, the hands 11, a crown 6, and the windshield glass 30.

The case 5 is formed of hard metal such as stainless steel or titanium, for example, and houses the movement 2 and the dial 3. The hands 11 include an hour hand 12 indicating hours, a minute hand 13 indicating minutes, and a second hand 14 indicating seconds. Lengths of the hour hand 12, the minute hand 13, and the second hand 14 become longer in this order. The crown 6 is a winding crown, and when the crown 6 is pulled by one step, it is possible to correct the time.

The second hand 14 is an example of a hand indicating information other than hours and minutes in the present application.

Scales 16 are provided on the dial 3. The scales 16 are constituted of hour scales 17 and minute scales 18, and are pointed by the hands 11. The hour scales 17 are disposed at positions obtained by dividing one circle, that is, 360 degrees by 12. The minute scales 18 are disposed at positions obtained by equally dividing a region between the hour scales 17 disposed adjacent to each other by 5. Additionally, the hour scale 17 is longer than the minute scale 18.

The scales 16 (the hour scales 17 and the minute scales 18) are an example of scales pointed by the hands in the present application.

The windshield glass 30 is a member having a circular shape in plan view as viewed from the Z direction, and protects the dial 3. The windshield glass 30 is described in detail later.

An end of the hour hand 12 in the X direction forms a distal end 12*a* of the hand 12, an end of the hand 13 in the X direction forms a distal end 13*a* of the minute hand 13, and an end of the second hand 14 in the X direction forms a distal end 14*a* of the second hand 14. Hereinafter, these portions are hereinafter collectively referred to as distal ends 11*a* of the hands 11. Further, an end of the hour scale 17 in the X direction forms an outer end 17*a* of the hour scale 17, and an end of the minute scale 18 in the X direction forms an outer end 18*a* of the minute scale 18. Hereinafter, these outer ends 17*a*, 18*a* are collectively referred to as outer ends 16*a* of the scales 16.

The distal ends 11*a* of the hands 11 (the distal end 12*a* of the hour hand 12, the distal end 13*a* of the minute hand 13, and the distal end 14*a* of the second hand 14) are an example of a distal end of the hand in the present application. The outer ends 16*a* of the scales 16 (the outer ends 17*a* of the hour scales 17 and the outer ends 18*a* of the minute scales 18) are an example of the outer end of the scale in the present application.

As illustrated in FIG. 2, in the timepiece 1 according to the present exemplary embodiment, the windshield glass 30 is attached to a +Z direction side of the case 5, and a back lid 9 is attached to a −Z direction side of the case 5. The movement 2, the dial 3, and the hands 11 are arranged, between the back lid 9 and the windshield glass 30, in this order along the +Z direction.

That is, the timepiece 1 according to the present exemplary embodiment includes the dial 3, the windshield glass 30 that protects the dial 3, and the hands 11 disposed between the dial 3 and the windshield glass 30.

The movement 2 includes a shaft 4 to which the hands 11 are attached, and a drive mechanism (not shown) that rotates the shaft 4.

A hole 8 that allows the shaft 4 to pass therethrough is formed in the dial 3. The shaft 4 passes through the hole 8, and protrudes in the +Z direction with respect to the dial 3. The hands 11 (the hour hand 12, the minute hand 13, the second hand 14) are attached to the portion of the shaft 4 protruding in the +Z direction.

1.2 Summary of Windshield Glass

Figure 3:
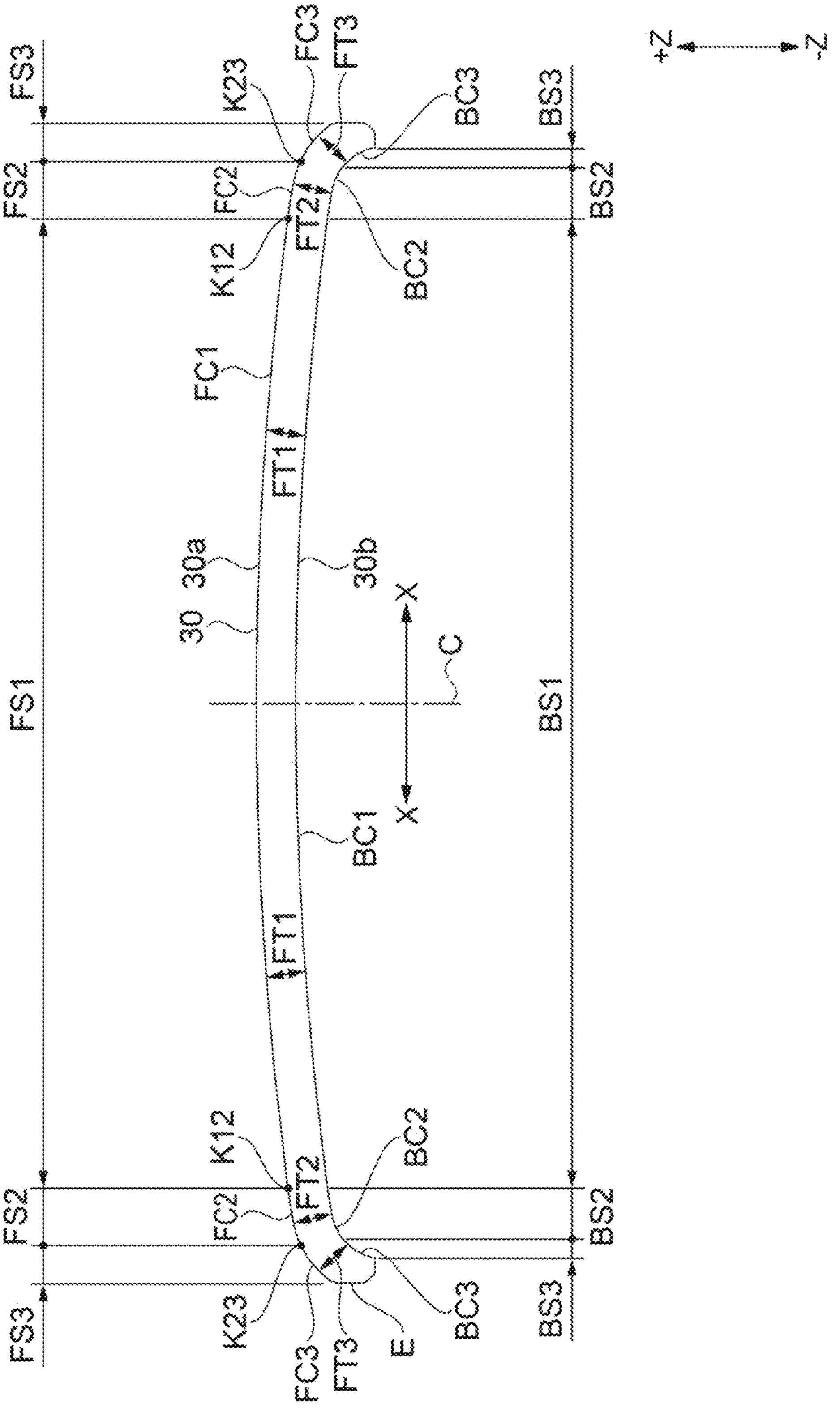
FIG. 3 is a cross-sectional view of a windshield glass.
Figure 5:
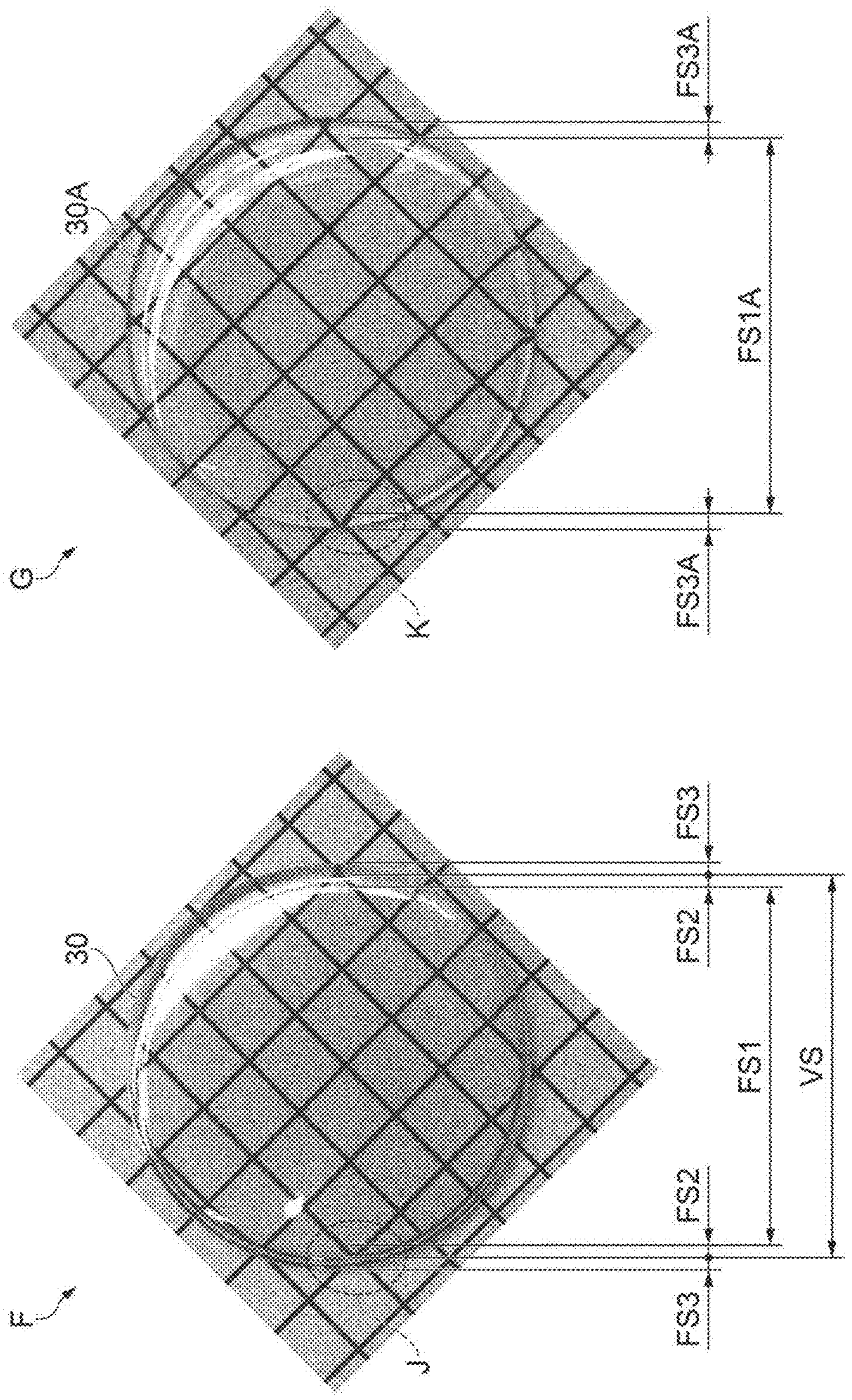
FIG. 5 shows photographs showing states of a grid-like test pattern visually recognized through windshield glasses.

FIG. 3 is a cross-sectional view of the windshield glass 30 taken along a line A-A in FIG. 1, and is a cross-sectional view of the windshield glass 30. FIG. 4 is a table showing radii of curvatures, curvatures, and thicknesses of main portions of the windshield glass 30. FIG. 5 shows photographs each showing a state of a grid-like test pattern visually recognized through the windshield glass 30, 30A.

In the following description, a surface of the windshield glass 30 on a +Z direction side is referred to as a surface 30*a*, and a surface of the windshield glass 30 on a −Z direction side is referred to as a back surface 30*b*.

Next, a summary of the windshield glass 30 is described with reference to FIG. 1 to FIG. 5.

The windshield glass 30 is made of sapphire glass. The windshield glass 30 is manufactured by polishing a crystal of artificially synthesized sapphire. The windshield glass 30 made of sapphire glass has excellent characteristics such as excellent light transmissivity, excellent visibility, and high scratch resistance because of high hardness.

As illustrated in FIG. 3 and FIG. 4, the surface 30*a* of the windshield glass 30 has a surface-side first curved surface FS1 including the center C of the windshield glass 30, a surface-side second curved surface FS2 disposed adjacent to the surface-side first curved surface FS1, and a surface-side third curved surface FS3 disposed adjacent to the surface-side second curved surface FS2. The back surface 30*b* of the windshield glass 30 has a back-surface-side first curved surface BS1 including the center C of the windshield glass 30, a back-surface-side second curved surface BS2 disposed adjacent to the back-surface-side first curved surface BS1, and a back-surface-side third curved surface BS3 disposed adjacent to the back-surface-side second curved surface BS2.

The surface-side first curved surface FS1 is an example of the first curved surface of the present application, the surface-side second curved surface FS2 is an example of the second curved surface of the present application, and the surface-side third curved surface FS3 is an example of the third curved surface of the present application.

In the surface 30*a* of the windshield glass 30, a radius of curvature of the surface-side first curved surface FS1 is FR1, a radius of curvature of the surface-side second curved surface FS2 is FR2, and a radius of curvature of the surface-side third curved surface FS3 is FR3. For example, the radius of curvature FR1 is 100 mm, the radius of curvature FR2 is 30 mm, and the radius of curvature FR3 is 5 mm. In this embodiment, the relationship FR1>FR2>FR3 is satisfied.

In the surface 30*a* of the windshield glass 30, a curvature of the surface-side first curved surface FS1 is FC1, a curvature of the surface-side second curved surface FS2 is FC2, and a curvature of the surface-side third curved surface FS3 is FC3. The curvature is an inverse of the radius of curvature, and when the radius of curvature is increased, the curvature is decreased, and when the radius of curvature is decreased, the curvature is increased. In the present exemplary embodiment, the relationship FC1<FC2<FC3 is satisfied.

The curvature FC1 is an example of the first curvature of the present application, the curvature FC2 is an example of the second curvature of the present application, and the curvature FC1 is an example of the third curvature of the present application.

Further, in the following description, the surface-side first curved surface FS1 is referred to as the first curved surface FS1, the surface-side second curved surface FS2 is referred to as the second curved surface FS2, and the surface-side third curved surface FS3 is referred to as the third curved surface FS3.

In the back surface 30*b* of the windshield glass 30, a radius of curvature of the back-surface-side first curved surface BS1 is BR1, a radius of curvature of the back-surface-side second curved surface BS2 is BR2, a radius of curvature of the back-surface-side third curved surface BS3 is BR3, and the relationship BR1>BR2>BR3 is satisfied. A curvature of the back-surface-side first curved surface BS1 is BC1, a curvature of the back-surface-side second curved surface BS2 is BC2, and a curvature of the back-surface-side third curved surface BS2 is BC3, and the relationship BC1<BC2<BC3 is satisfied.

As described above, the windshield glass 30 includes the plurality of curved surfaces having different curvatures (the first curved surface FS1, the second curved surface FS2, and the third curved surface FS3). Further, the windshield glass 30 includes the first curved surface FS1 (first curved surface) having the curvature FC1 (first curvature) and including the center C of the windshield glass 30, the second curved surface FS2 (second curved surface) disposed adjacent to the first curved surface FS1 and having the curvature FC2 (second curvature) that is larger than the curvature FC1, and the third curved surface FS3 (third curved surface) disposed adjacent to the second curved surface FS2 and having the curvature FC3 (third curvature) that is larger than the curvature FC2.

That is, in the windshield glass 30, the second curved surface FS2 having a medium curvature FCn is disposed between the first curved surface FS1 disposed at the center C side and having a small curvature FCn and the third curved surface FS3 disposed on an outer edge E side and having a large curvature FCn. With such a configuration, a change in curvature FCn in a direction (X direction) directed from the center C toward the outer edge E of the windshield glass 30 is decreased, that is, the change in curvature FCn in the X direction becomes gentle.

Further, in the windshield glass 30, a thickness in a direction normal to the first curved surface FS1 is FT1, a thickness in a direction normal to the second curved surface FS2 is FT2, and a thickness in a direction normal to the third curved surface FS3 is FT3. For example, the thickness FT1 in the direction normal to the first curved surface FS1 is lmm.

In the present exemplary embodiment, the thickness FT1 in the direction normal to the first curved surface FS1, the thickness FT2 in the direction normal to the second curved surface FS2, and the thickness FT3 in the direction normal to the third curved surface FS3 are equal. That is, the relationship FT1=FT2=FT3 is satisfied.

As described above, the present exemplary embodiment has a configuration in which the thickness FT1 in the direction normal to the first curved surface FS1 of the windshield glass 30 (the thickness in the direction normal to the first curved surface) and the thickness FT2 in the direction normal to the second curved surface FS2 of the windshield glass 30 (the thickness in the direction normal to the second curved surface) are equal.

In the present application, "the thickness in the direction normal to the first curved surface FS1 and the thickness in the direction normal to the second curved surface FS2 are equal" means a state where the variation in the thickness in the normal direction is ±10% or less. For example, when the thickness TF1 in the direction normal to the first curved surface FS1 is set to a value within a range of from 0.9 mm to 1.1 mm inclusive, and the thickness FT2 in the direction normal to the second curved surface FS2 is set to a value within a range of from 0.9 mm to 1.1 mm inclusive, the thickness TF1 in the direction normal to the first curved surface FS1 and the thickness FT2 in the direction normal to the second curved surface FS2 are equal, and such a configuration is included in the technical scope of the present application.

In general, when the thickness in the normal direction of the windshield glass 30 is uniform, and the curvature FCn is small, the refraction of light passing through the windshield glass 30 is small and hence, distortion of an image visually recognized through the windshield glass 30 is small. Accordingly, an influence of the so-called lens effect becomes small so that an image visually recognized through the windshield glass 30 is minimally distorted.

Although details are described later, the curvature FC1 of the first curved surface FS1 and the curvature FC2 of the second curved surface FS2 are set to the small curvature FCn and hence, distortion of an image visually recognized through the first curved surface FS1 of the windshield glass 30 and distortion of an image visually recognized through the second curved surface FS2 of the windshield glass 30 are small (see FIG. 5).

As a result, in the windshield glass 30, the first curved surface FS1 and the second curved surface FS2 form a visual recognition surface VS that is less likely to cause distortion of an image. A user can visually recognize the hands 11 and the scales 16 through the first curved surface FS1 and the second curved surface FS2 of the windshield glass 30 in a natural state in which distortion of an image is small.

On the other hand, when the thickness in the normal direction of the windshield 30 is uniform, and the curvature FCn is large, the refraction of light passing through the windshield 30 is increased and hence, the image visually recognized through the windshield glass 30 is enlarged or reduced so that distortion of an image visually recognized through the windshield glass 30 is increased. The influence of the so-called lens effect becomes large, and distortion occurs in the image visually recognized through the windshield glass 30.

Although details are described later, the curvature FCn of the third curved surface FS3, that is, the curvature FC3 is large and hence, distortion of an image visually recognized through the third curved surface FS3 of the windshield glass 30 is increased (see FIG. 5).

That is, the influence of the lens effect becomes extremely large in the third curved surface FS3, and distortion of an image visually recognized through the third curved surface FS3 is increased and hence, it is not desirable to use the third curved surface FS3 of the windshield glass 30 as the visual recognition surface VS that is less likely to cause distortion of an image.

In the windshield glass 30, a boundary between the first curved surface FS1 and the second curved surface FS2 is a boundary K12, and a boundary between the second curved surface FS2 and the third curved surface FS3 is a boundary K23. In FIG. 3, the boundary K12 and the boundary K23 are respectively indicated by black dots. In addition, in FIG. 1 and FIG. 2, the boundary K12 is indicated by a broken line, and the boundary K23 is indicated by a double-dashed chain line.

The boundary K12 is an example of the boundary between the first curved surface and the second curved surface in the present application, and the boundary K23 is an example of the boundary between the second curved surface and the third curved surface in the present application.

As illustrated in FIG. 1 and FIG. 2, as viewed in plan view in the Z direction, the outer ends 16*a* of the scales 16 (the outer ends 17*a* of the hour scales 17, the outer ends 18*a* of the minute scales 18) are disposed between the boundary K23 between the second curved surface FS2 and the third curved surface FS3 and the distal end 11*a* of the hand 11. Specifically, in plan view as viewed in the Z direction, the outer ends 16*a* of the scales 16 (the outer ends 17*a* of the hour scales 17, the outer ends 18*a* of the minute scales 18) are disposed between the boundary K23 between the second curved surface FS2 and the third curved surface FS3 and the distal end 14*a* of the second hand 14.

Further, in plan view as viewed in the Z direction, the minute scales 18 are disposed so as to overlap with the second curved surface FS2, and the hour scales 17 are disposed so as to overlap with the first curved surface FS1 and the second curved surface FS2.

Then, the user can visually recognize the scales 16 through the first curved surface FS1 and the second curved surface FS2 of the windshield glass 30 and hence, the user can visually recognize the scales 16 in a state where distortion of an image is small. As a result, the visibility of the scales 16 can be enhanced.

In plan view as viewed in the Z direction, the distal ends 11*a* of the hands 11 (the distal end 12*a* of the hour hand 12, the distal end 13*a* of the minute hand 13, and the distal end 14*a* of the second hand 14) are disposed on a center C side of the windshield glass 30 with respect to the boundary K23 between the second curved surface FS2 and the third curved surface FS3.

Specifically, in plan view as viewed in the Z direction, the distal end 12*a* of the hour hand 12 is disposed on the center C side of the windshield glass 30 with respect to the boundary K12, and the distal end 13*a* of the minute hand 13 and the distal end 14*a* of the second hand 14 are disposed between the boundary K12 and the boundary K23.

With such a configuration, the user can visually recognize the hands 11 through the first curved surface FS1 and the second curved surface FS2 of the windshield glass 30 and hence, the user can visually recognize the hands 11 in a state where distortion of an image is small. As a result, the visibility of the hands 11 is increased.

Further, in the present exemplary embodiment, in plan view as viewed in the Z direction, the first curved surface FS1 has the largest area in the windshield glass 30.

In general, in a case where the thickness in the normal direction is the same, the influence of the lens effect depends on the curvature FCn, and when the curvature FCn is decreased, the influence of the lens effect becomes small, and when the curvature FCn is increased, the influence of the lens effect becomes large. In the windshield glass 30 of the present exemplary embodiment, the curvature FC1 of the first curved surface FS1 is the smallest curvature and hence, the influence of the lens effect is minimized so that distortion of an image visually recognized through the first curved surface FS1 is minimized. Accordingly, when the first curved surface FS1 has the largest area in the windshield glass 30, out of the visual recognition surface VS of the windshield glass 30, a portion where distortion of an image can be minimized becomes largest and hence, the time display and the like can be viewed most easily. Accordingly, it is desirable to adopt a configuration in which the first curved surface FS1 has the largest area in the windshield glass 30.

Further, in the present exemplary embodiment, in plan view as viewed in the Z direction, the scales 16 do not overlap with the third curved surface FS3.

The influence of the lens effect becomes extremely large in the third curved surface FS3, and distortion of an image visually recognized through the third curved surface FS3 of the windshield glass 30 is increased and hence, it is not desirable to use the third curved surface FS3 of the windshield glass 30 as the visual recognition surface VS that is less likely to cause distortion of an image.

When the scales 16 do not overlap with the third curved surface FS3 in plan view as viewed in the Z direction, there is no possibility that the user visually recognizes the scales 16 in a distorted manner through the third curved surface FS3 of the windshield glass 30 and hence, the visibility of the scales 16 can be enhanced.

In the present exemplary embodiment, the second curved surface FS2 having the medium curvature FCn is disposed between the first curved surface FS1 having the small curvature FCn and the third curved surface FS3 having the large curvature FCn. The second curved surface FS2 is disposed between the first curved surface FS1 and the third curved surface FS3, and is configured to make a change in curvature FCn in the direction (X direction) directed from the center C toward the outer edge E of the windshield glass 30 small thus making the change of the curvature FCn gentle.

For example, a change point of the curvature FCn becomes a change point of an optical characteristic such as refraction of light, and the more the change of the optical characteristic is gentle, the more distortion of the visible image becomes inconspicuous. In the present exemplary embodiment, due to the provision of the second curved surface FS2, the change in curvature FCn can be made small so that the change in optical characteristic caused by the change in curvature FCn can be made small. As a result, the user can visually recognize the hands 11 and the scales 16 through the first curved surface FS1 and the second curved surface FS2 of the windshield glass 30 in a natural state in which distortion of the image is small.

Further, in the present exemplary embodiment, in addition to the first curved surface FS1 having the small curvature FCn, the second curved surface FS2 having the medium curvature can be used as the visual recognition surface VS where distortion of the image is small and hence, a useful area of the windshield glass 30 that can be used as the visual recognition surface VS can be increased compared to a case where the second curved surface FS2 is not provided.

FIG. 5 shows photographs showing how a grid-like test pattern is visually recognized through the windshield glasses 30, 30A in a state where the windshield glass 30 of the present exemplary embodiment and the windshield glass 30A of a comparison example are respectively placed on a test paper on which the grid-like test pattern is printed.

In FIG. 5, the windshield glass 30 of the present exemplary embodiment is indicated by symbol F, and the windshield glass 30A of the comparison example is indicated by symbol G.

In FIG. 5, symbol F indicates the windshield glass 30 of the present exemplary embodiment. The windshield glass 30 of the present exemplary embodiment includes the first curved surface FS1 disposed at the center C side and having the small curvature FCn, the second curved surface FS2 having the medium curvature FCn, and the third curved surface FS3 disposed on the outer edge E side and having the large curvature FCn. The second curved surface FS2 having the medium curvature FCn is disposed between the first curved surface FS1 having the small curvature FCn and the third curved surface FS3 having the large curvature FCn.

On the other hand, in FIG. 5, the symbol G indicates the windshield glass 30A of the comparison example, and the windshield glass 30A of the comparison example has a first curved surface FS1A disposed on a center C side of the windshield glass 30A and having a small curvature FCn, and a third curved surface FS3A disposed on an outer edge E side of the windshield glass 30A and having a large curvature FCn, and the windshield glass 30A of the comparison example does not have the second curved surface FS2 having the medium curvature FCn.

This point is the main difference between the windshield glass 30 of the present exemplary embodiment and the windshield glass 30A of the comparison example. That is, the windshield glass 30A of the comparison example is characterized in that a change in curvature FCn in a direction directed from the center C toward the outer edge E of the windshield glass 30A is rapid and, further, an area of the third curved surface FS3A having the large curvature FCn is larger than that of the windshield glass 30 of the present exemplary embodiment.

The curvature FCn (the curvature FC1) of the first curved surface FS1 and the curvature FCn of the first curved surface FS1A are substantially the same, and the curvature FCn (the curvature FC3) of the third curved surface FS3 and the curvature FCn of the third curved surface FS3A are substantially the same.

As described above, in a case where the thickness in the normal direction is uniform, the influence of the lens effect depends on the curvature FCn and hence, the influence of the lens effect and the curvature FCn have the following relationship. That is, when the curvature FCn is decreased, the influence of the lens effect becomes small, and when the curvature FCn is increased, the influence of the lens effect becomes large.

As illustrated by a region J surrounded by a broken line in FIG. 5, in the windshield glass 30 of the present exemplary embodiment, when the grid-like test pattern is visually recognized thorough the first curved surface FS1 having the small curvature FCn and the second curved surface FS2 having the medium curvature FCn, distortion of an image does not occur, and when the grid-like test pattern is visually recognized through the third curved surface FS3 having the large curvature FCn, distortion of an image occurs.

As illustrated by a region K surrounded by a broken line in FIG. 5, in the windshield glass 30A of the comparison example, when the grid-like test pattern is visually recognized thorough the first curved surface FS1A having the small curvature FCn, distortion of an image does not occur, and when the grid-like test pattern is visually recognized through the third curved surface FS3A having the large curvature FCn, distortion of an image occurs.

In the windshield glass 30 of the present exemplary embodiment, the curvature FC1 of the first curved surface FS1 is the smallest curvature and hence, the influence of the lens effect is minimized so that distortion of an image visually recognized through the first curved surface FS1 is minimized.

The curvature FC2 of the second curved surface FS2 is larger than the curvature FC1 of the first curved surface FS1 and hence, distortion of an image that is visually recognized through the second curved surface FS2 is larger than distortion of an image visually recognized through the first curved surface FS1. However, the curvature FC2 of the second curved surface FS2 is equal to or larger than the curvature FC1 of the first curved surface FS1 and is less than the curvature FC3 of the third curved surface FS3. Accordingly, a change in curvature FCn can be suppressed to a relatively gentle change. In addition, the first curved surface FS1 and the second curved surface FS2 are equal in thickness in the normal direction and hence, a change in optical characteristic becomes small, and distortion of an image visually recognized through the second curved surface FS2 of the windshield glass 30 becomes extremely small. Accordingly, the second curved surface FS2 of the windshield glass 30 can be used as the visual recognition surface VS that is less likely to cause distortion of an image in addition to the first curved surface FS1 of the windshield glass 30.

As a result, when the user visually recognizes the hands 11 and the scales 16 through the first curved surface FS1 and the second curved surface FS2 of the windshield glass 30, the user can visually recognize the hands 11 and the scales 16 in a natural state in which distortion of an image is small.

On the other hand, the influence of the lens effect becomes extremely large in the third curved surface FS3, and distortion of an image visually recognized through the third curved surface FS3 is increased and hence, it is not desirable to use the third curved surface FS3 of the windshield glass 30 as the visual recognition surface VS that is less likely to cause distortion of an image.

On the other hand, in the windshield glass 30A of the comparison example, when the user visually recognizes the grid-like test pattern through the first curved surface FS1A having the small curvature FCn of the windshield glass 30A, distortion of an image is less likely to occur and hence, the first curved surface FS1A of the windshield glass 30A can be used as the visual recognition surface VS that is less likely to cause distortion of an image.

However, in the third curved surface FS3A having the large curvature FCn of the windshield glass 30A, the influence of the lens effect becomes large and hence, distortion of an image visually recognized through the third curved surface FS3A is increased. Further, an area of the third curved surface FS3A of the comparison example is larger than that of the present exemplary embodiment, and the third curved surface FS3A of the comparison example extends to a position overlapping with the scales 16 and the hands 11 and hence, images of the scales 16 and the hands 11 are distorted whereby it is difficult for the timepiece to obtain a desirable external appearance.

Further, in the windshield glass 30A of the comparison example, the second curved surface FS2 having the medium curvature FCn is not disposed between the first curved surface FS1A having the small curvature FCn and the third curved surface FS3A having the large curvature FCn and hence, an area of the region that can be used as the visual recognition surface VS in the windshield glass 30A becomes small compared to that of the windshield glass 30 of the present exemplary embodiment.

Further, a rapid change in curvature FCn occurs at the boundary between the first curved surface FS1A having the small curvature FCn and the third curved surface FS3A having the large curvature FCn. In this case, there is a concern that the large distortion of an image occurs in a portion where the rapid change in curvature FCn occurs. That is, a change point of the curvature FCn becomes a change point of the optical characteristic such as refraction of light, and the optical characteristic changes rapidly at the change point and hence, distortion of a visually recognized image stands out conspicuously.

In the windshield glass 30 of the present exemplary embodiment, the second curved surface FS2 having the medium curvature FCn is disposed between the first curved surface FS1 having the small curvature FCn and the third curved surface FS3 having the large curvature FCn. The second curved surface FS2 is disposed between the first curved surface FS1 and the third curved surface FS3 and hence, a change in curvature FCn generated at the boundary K12 between the first curved surface FS1 and the second curved surface FS2 and the boundary K23 between the second curved surface FS2 and the third curved surface FS3 becomes small.

As a result, a rapid change in curvature FCn is alleviated by the second curved surface FS2 and hence, a change in optical characteristic caused by the change in curvature FCn becomes small, and distortion of a visually recognized image can be made inconspicuous. That is, in the windshield glass 30 of the present exemplary embodiment, large distortion of an image that may occur in the windshield glass 30A of the comparison example is less likely to occur.

As described above, the timepiece according to the present exemplary embodiment has, in addition to the configuration in which the thickness FT1 of the windshield glass 30 in the direction normal to the first curved surface FS1 and the thickness FT2 of the windshield glass 30 in the direction normal to the second curved surface FS2 are the same, the configuration in which the second curved surface FS2 having the medium curvature FCn is disposed between the first curved surface FS1 having the small curvature FCn and the third curved surface FS3 having the large curvature FCn.

With such a configuration, in addition to the first curved surface FS1 having the small curvature FCn, the second curved surface FS2 having the medium curvature FCn can be used as the visual recognition surface VS through which an image can be visually recognized with little distortion and hence, an area that can be used as the visual recognition surface VS in the windshield glass 30 is widened. In addition, a rapid change in curvature FCn at the boundary between the curved surfaces having the different curvatures is alleviated so that the occurrence of a defect due to the rapid change in curvature FCn (for example, a large image distortion) can be suppressed.

The present exemplary embodiment described above may be modified as follows. The present exemplary embodiment described above and modified examples thereof to be described below may be implemented in combination within a range in which a technical contradiction does not arise.

The hand in the present application is not limited to the second hand 14, for example, may be a GMT hand in a GMT timepiece, for example, may be a chronograph hand in a chronograph timepiece, and, for example, may be a hand indicating functional information other than time by pointing.

The windshield glass 30 of the above-mentioned embodiment has the single second curved surface FS2 having the medium curvature FCn between the first curved surface FS1 having the small curvature FCn and the third curved surface FS3 having the large curvature FCn. The number of curved surfaces each having a medium curvature FCn disposed between the first curved surface FS1 and the third curved surface FS3 is not limited to one curved surface, and a plurality of the curved surfaces may be provided. In other words, a plurality of curved surfaces may be provided as the second curved surface of the present application.

Further, when the plurality of curved surfaces are provided as the second curved surface of the present application, it is preferable that curvatures of the plurality of curved surfaces be set so as to be gradually increased from the first curved surface FS1 having the small curvature FCn toward the third curved surface FS3 having the large curvature FCn. That is, it is preferable that the second curved surface of the present application have a configuration in which the curvature of the second curved surface gradually increases from the boundary between the first curved surface and the second curved surface toward the boundary between the second curved surface and the third curved surface. In this case, it is preferable that the windshield glass 30 have the same thickness at the plurality of curved surfaces constituting the second curved surface FC2.

For example, in the windshield glass 30A of the comparison example, a rapid change in curvature FCn occurs at the boundary between the first curved surface FS1A having the small curvature FCn and the third curved surface FS3A having the large curvature FCn and hence, there is a concern that a large image distortion occurs.

For example, in the windshield glass 30 of the present exemplary embodiment, the second curved surface FS2 having the medium curvature FCn is disposed between the first curved surface FS1 having the small curvature FCn and the third curved surface FS3 having the large curvature FCn and hence, a rapid change in curvature FCn at the boundary of the curved surfaces having different curvatures is alleviated and hence, the concern that the large image distortion occurs can be suppressed. Accordingly, the user can visually recognize the hands 11 and the scales 16 in a natural state.

For example, when a plurality of curved surfaces having different curvatures are provided between the first curved surface FS1 having the small curvature FCn and the third curved surface FS3 having the large curvature FCn and the curvatures are gradually changed, a rapid change in curvature FCn at the boundary of the curved surfaces having different curvatures is alleviated and hence, the concern that the large image distortion occurs can be further suppressed. Accordingly, the user can visually recognize the hands 11 and the scales 16 in a more natural state. That is, since the curvatures of the plurality of curved surfaces are gradually changed between the first curved surface FS1 having the small curvature FCn and the third curved surface FS3 having the large curvature FCn, the change in curvature can be further decreased and hence, distortion of a visually recognized image becomes smaller whereby the visibility of time display and the like can be further enhanced.

In the present exemplary embodiment, the description has been made with respect to a configuration in which the scales 16 are disposed on the center C side of the windshield glass 30 with respect to the boundary K23 between the second curved surface FS2 and the third curved surface FS3 and, however, this should not be construed to exclude a configuration in which the outer ends 16*a* of the scales are disposed on a slightly outer edge E side of the windshield glass 30 with respect to the boundary K23.

For example, even when approximately 10% of each scale 16 protrudes to the outer edge E side of the windshield glass 30 with respect to the boundary K23, and the outer end 16*a* of the scale is disposed between the boundary K23 and the outer edge E, the influence of distortion of an image with respect to the scale 16 is small and hence, distortion of an image in plan view as viewed in the Z direction is less likely to be visually recognized. In the same manner, even when approximately 10% of the hand 11 (the second hand 14) protrudes toward the outer edge E side of the windshield glass 30 with respect to the boundary K23, and the distal end 11*a* of the hand 11 (the distal end 14*a* of the second hand 14) is disposed between the boundary K23 and the outer edge E, the influence of distortion of an image with respect to the hand 11 is small and hence, distortion of an image in plan view as viewed in the Z direction is less likely to be visually recognized.

As described above, when distortion of an image as viewed in plan view in the Z direction is substantially small, a configuration of the timepiece 1 is not limited to the configuration in which the scales 16 and the hands 11 are entirely disposed on the center C side of the windshield glass 30 with respect to the boundary K23 between the second curved surface FS2 and the third curved surface FS3, and the scales 16 and the hands 11 may be partially disposed on the outer edge E side of the windshield glass 30 with respect to the boundary K23 between the second curved surface FS2 and the third curved surface FS3.

What is claimed is:

1. A timepiece comprising:

a dial including a scale;

a windshield glass configured to protect the dial and having a plurality of curved surfaces that differ from each other in curvature; and a hand disposed between the dial and the windshield glass and configured to indicate information other than hours and minutes, wherein the windshield glass includes:

a first curved surface having a first curvature and including a center of the windshield glass;

a second curved surface disposed adjacent to the first curved surface and having a second curvature larger than the first curvature; and a third curved surface disposed adjacent to the second curved surface and having a third curvature larger than the second curvature, a thickness of the windshield glass in a direction normal to the first curved surface and a thickness of the windshield glass in a direction normal to the second curved surface are equal, in a plan view as viewed in a first direction directed from the dial toward the windshield glass, a distal end of the hand is located closer to the center of the windshield glass than a boundary between the second curved surface and the third curved surface, a distal end of the scale is located closer to the boundary between the second curved surface and the third curved surface than the distal end of the hand in the plan view, and a center of the scale in a cross section is located closer to the center of the windshield glass than a boundary between the first curved surface and the second curved surface.

2. The timepiece according to claim 1, wherein the scale is pointed by the hand.

3. The timepiece according to claim 1, wherein the second curved surface has the second curvature that increases gradually from the boundary between the first curved surface and the second curved surface toward the boundary between the second curved surface and the third curved surface.

4. The timepiece according to claim 1, wherein in the plan view, the first curved surface has the largest area in the windshield glass.

5. The timepiece according to claim 1, wherein the windshield glass is made of sapphire glass.

* * * * *